April 13, 1943.         J. H. STAAK         2,316,635
ROTATABLE ELECTRICAL DEVICE
Filed May 12, 1942
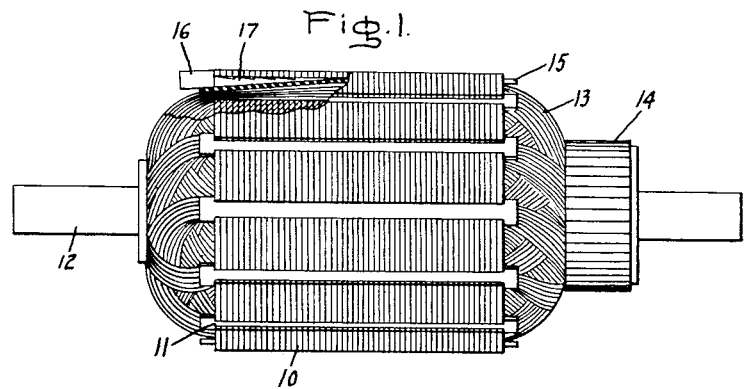
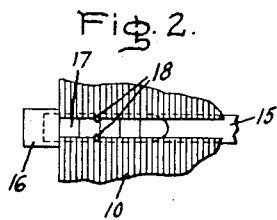 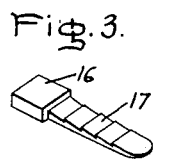 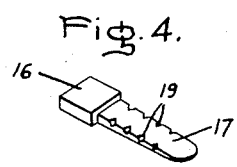
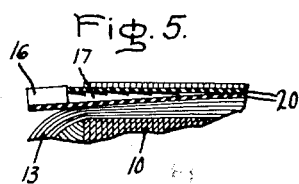 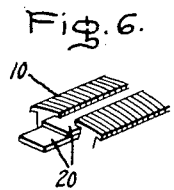 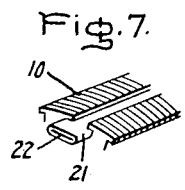
Inventor:
Julius H. Staak,
by Harry E. Dunham
His Attorney.

Patented Apr. 13, 1943

2,316,635

UNITED STATES PATENT OFFICE 2,316,635

ROTATABLE ELECTRICAL DEVICE

Julius H. Staak, Fort Wayne, Ind., assignor to General Electric Company, a corporation of New York Application May 12, 1942, Serial No. 442,583

8 Claims. (Cl. 171—206)

My invention relates to rotatable electrical devices such as the rotatable members of dynamo-electric machines.

An object of my invention is to provide an improved rotatable electrical device by providing an improved and simplified arrangement for balancing the rotatable member.

Another object of my invention is to provide an improved balancing weight for the rotatable member of an electrical device.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view of a rotatable armature member partly broken away to show the arrangement of my improved balancing device; Fig. 2 is a plan view of a part of the armature shown in Fig. 1 illustrating the balancing device; Fig. 3 is a perspective view of the balancing weight shown in Figs. 1 and 2; Fig. 4 is a perspective view of a modification of the balancing weight shown in Fig. 3; Fig. 5 is a partial sectional elevational view of a rotatable armature member provided with a modification of my balancing device; Fig. 6 is a perspective partial view of the rotatable armature member shown in Fig. 5 prior to the application of a balancing weight; and Fig. 7 is a perspective view of a modification of the rotatable armature member shown in Fig. 6.

Referring to the drawing, I have shown a rotatable armature member for a dynamo-electric machine provided with a laminated core 10 having winding slots 11 therein and mounted on a supporting shaft 12. The armature is provided with a winding 13 extending through the winding slots 11 and connected to a commutator 14. The sides of the winding 13 are retained in the winding slots 11 by insulating slot wedges 15 arranged over the winding in each of the slots. In general, rotatable members such as this armature are not statically and dynamically balanced without the provision of special balancing members. When such a machine is provided with a relatively short length axially thereof, the proper balancing of the machine sometimes requires an undesirably large balancing weight, as when such a weight is secured to the member within the winding slots, the leverage of the weight is considerably reduced. My improved construction includes a balancing weight 16 which is adapted to extend axially beyond the outer axial ends of the core 10 and to be secured thereto by a roughened stepped portion 17 which is driven within a winding slot over one of the insulating slot wedges 15 in engagement with a portion of the laminated core. The proper location for the balancing weight may be determined in any conventional manner, and the size of the balancing weight may be adjusted to provide the desired balancing force. With such an arrangement, the leverage of the weight 16 is increased and a relatively smaller weight is necessary to provide the desired balancing effect than would be required if the weight 16 did not extend axially beyond the end of the core 10. The weight 16 is prevented from being thrown off the armature by prick-punching one of the laminations of the core 10 as shown at 18 to provide a projection on the lamination which extends into engagement with one of the steps of the wedge shaped securing portion 17 of the weight.

Fig. 4 shows a modification of the stepped wedge securing portion of the balancing weight shown in Figs. 1 to 3, wherein the wedge portion 17 is formed with a plurality of roughening notches 19 adapted to engage the laminations of the core 10 and into which one or more of the laminations of the core may be prick-punched to prevent dislocation of the wedge after it has been secured in position in a winding slot of the core.

Under certain conditions, it may be desirable to insulate the balancing weight on both sides thereof to prevent short circuiting of the laminations by the wedge portion 17. Figs. 5 and 6 show a winding slot retaining wedge construction which will provide for the insulation of a balancing weight. In this construction, a double wedge is used, as shown in Fig. 6, and the roughened wedge shaped portion 17 of the balancing weight is driven between the two portions 20 of the double winding slot wedge within a winding slot. As shown in Fig. 5, the roughened retaining portion 17 engages the upper slot wedge portion 20 and prevents dislocation of the weight 16 during operation of the armature. Such a construction also enables the arrangement of the balancing weight 16 to be axially displaced a greater distance from the axial center of the armature than the construction shown in Figs. 1 and 2, as the insulating slot wedges 20 provide supports for the balancing weight outside of the core 10.

Fig. 7 shows another embodiment of the arrangement illustrated in Figs. 5 and 6 wherein the insulating winding slot wedge is formed of a tubular double walled member 21 having a central passage 22 therethrough. The roughened mounting portion 17 of the balancing weight 16 may be driven within the tubular winding slot wedge 21 in a manner similar to that shown in Fig. 5 for securing the balancing weight to the armature core 10 for balancing the rotatable armature member.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamo-electric machine rotatable member having a laminated core with winding slots therein, a winding in said slots, and means including a balancing weight extending axially beyound the end of said core and having a roughened portion in engagement with a portion of said laminated core in one of said slots for balancing said rotatable member.

2. A dynamo-electric machine rotatable member having a core with winding slots therein, a winding in said slots, an insulating slot wedge arranged over said winding in each of said slots, and means including a balancing weight extending axially beyond the end of said core and provided with a stepped portion driven in one of said slots over a portion of one of said insulating slot wedges for balancing said rotatable member.

3. A dynamo-electric machine rotatable member having a core with winding slots therein, a winding in said slots, an insulating slot wedge arranged over said winding in each of said slots, and means including a balancing weight extending axially beyond the end of said core and provided with a roughened wedge shaped portion driven in one of said slots over a portion of one of said insulating slot wedges for balancing said rotatable member.

4. A dynamo-electric machine rotatable member having a core with winding slots therein, a winding in said slots, an insulating slot wedge arranged over said winding in each of said slots, and means including a balancing weight extending axially beyond the end of said core and provided with a stepped portion driven in one of said slots over a portion of one of said insulating slot wedges with said stepped portion in engagement with a portion of said core for balancing said rotatable member.

5. A dynamo-electric machine rotatable member having a core with winding slots therein, a winding in said slots, insulating double walled slot wedges arranged over said winding in said slots, and means including a balancing weight extending axially beyond the end of said core and provided with a portion driven in one of said slots between the double walls of one of said insulating slot wedges for balancing said rotatable member.

6. A dynamo-electric machine rotatable member having a core with winding slots therein, a winding in said slots, insulating double walled slot wedges arranged over said winding in said slots, and means including a balancing weight extending axially beyound the end of said core and provided with a roughened wedge shaped portion driven in one of said slots between the double walls of one of said insulating slot wedges for balancing said rotatable member.

7. A dynamo-electric machine rotatable member having a core with winding slots therein, a winding in said slots, insulating tubular slot wedges arranged over said winding in said slots, and means including a balancing weight extending axially beyond the end of said core and provided with a portion driven in one of said slots within a portion of one of said insulating slot wedges for balancing said rotatable member.

8. A dynamo-electric machine rotatable member having a core with winding slots therein, a winding in said slots, insulating tubular slot wedges arranged over said winding in said slots, and means including a balancing weight extending axially beyond the end of said core and provided with a roughened wedge shaped portion drive in one of said slots within a portion of one of said tubular insulating slot wedges for balancing said rotatable member.

JULIUS H. STAAK.